United States Patent
Uselton (10) Patent No.: US 11,143,417 B2
(45) Date of Patent: Oct. 12, 2021

(54) METHOD AND APPARATUS FOR REDUCTION OF WATER RE-EVAPORATION IN A DEDICATED DEHUMIDIFIER/WATER HEATER

(71) Applicant: Lennox Industries Inc., Richardson, TX (US)

(72) Inventor: Robert B. Uselton, Plano, TX (US)

(73) Assignee: Lennox Industries Inc., Richardson, TX (US)

( * ) Notice: Subject to any disclaimer, the term of this patent is extended or adjusted under 35 U.S.C. 154(b) by 18 days.

(21) Appl. No.: 16/899,635

(22) Filed: Jun. 12, 2020

(65) Prior Publication Data

US 2020/0309384 A1 Oct. 1, 2020

Related U.S. Application Data

(63) Continuation of application No. 15/271,419, filed on Sep. 21, 2016, now Pat. No. 10,724,744.

(51) Int. Cl.
| | |
|---|---|
| *F25B 6/02* | (2006.01) |
| *F24D 11/02* | (2006.01) |
| *F24F 3/14* | (2006.01) |
| *F24F 11/00* | (2018.01) |
| *F25B 30/02* | (2006.01) |
| *F24D 17/00* | (2006.01) |

(Continued)

(52) U.S. Cl.
CPC ........ *F24D 11/0242* (2013.01); *F24D 17/001* (2013.01); *F24D 17/02* (2013.01); *F24F 3/14* (2013.01); *F24F 11/0008* (2013.01); *F25B 6/02* (2013.01); *F25B 30/02* (2013.01); *F25B 41/26* (2021.01); *F24D 2200/123* (2013.01); *F24D 2200/22* (2013.01); *F24F 2003/1446* (2013.01); *F25B 2339/047* (2013.01); *F25B 2600/2507* (2013.01); *Y02B 10/70* (2013.01); *Y02B 30/18* (2013.01); *Y02B 30/52* (2013.01)

(58) Field of Classification Search
CPC .... F24D 11/0242; F24D 17/001; F24D 17/02; F24D 2200/123; F24D 2200/22; F24F 11/0008; F24F 2003/1446; F24F 3/14; F25B 2339/047; F25B 2600/2507; F25B 30/02; F25B 41/26; F25B 6/02; Y02B 10/70; Y02B 30/18; Y02B 30/52
See application file for complete search history.

(56) References Cited

U.S. PATENT DOCUMENTS

| | | |
|---|---|---|
| 4,460,122 A | 7/1984 | Jardinier et al. |
| 6,044,653 A | 4/2000 | Iritani et al. |
| 6,523,359 B1 | 2/2003 | Posch |

(Continued)

*Primary Examiner* — Filip Zec
(74) *Attorney, Agent, or Firm* — Shackelford, Bowen, McKinley & Norton, LLP (57) ABSTRACT

An apparatus that includes a refrigeration circuit that includes an evaporator, a first condenser and a compressor. The apparatus includes a refrigerant-water heat exchanger that includes a second condenser fluidly coupled to the refrigeration circuit. A control valve is operatively connected to the refrigeration circuit to direct flow of refrigerant through at least one of the first condenser during a dehumidification mode and the second condenser during a water heating mode. A damper is disposed on an upwind side of the evaporator, the damper being operable to reduce airflow across the evaporator during a ventilation mode.

20 Claims, 5 Drawing Sheets

(51) Int. Cl.
 *F24D 17/02* (2006.01)
 *F25B 41/26* (2021.01)

(56) References Cited

U.S. PATENT DOCUMENTS

| | | | |
|---|---|---|---|
| 6,826,921 B1 | 12/2004 | Uselton | |
| 7,062,930 B2 * | 6/2006 | Rayburn | F24F 3/153 |
| 7,191,604 B1 * | 3/2007 | Wiggs | F24F 3/14 |
| 8,689,574 B2 | 4/2014 | Uselton | |
| 9,810,462 B2 | 11/2017 | Douglas | |
| 2010/0326127 A1 | 12/2010 | Oomura et al. | |

* cited by examiner

METHOD AND APPARATUS FOR REDUCTION OF WATER RE-EVAPORATION IN A DEDICATED DEHUMIDIFIER/WATER HEATER

CROSS-REFERENCE TO RELATED APPLICATIONS

This patent application is a continuation of U.S. patent application Ser. No. 15/271,419, filed on Sep. 21, 2016. U.S. patent application Ser. No. 15/271,419 is incorporated herein by reference. This patent application incorporates by reference, for any purpose, the entire disclosure of U.S. Pat. No. 8,689,574, filed on Aug. 25, 2010.

STATEMENT REGARDING FEDERALLY-SPONSORED RESEARCH AND DEVELOPMENT

This invention was made with government support under Contract No. NFE-07-01094 started November 2007 with the U.S Department of Energy. The government has certain rights in the invention.

TECHNICAL FIELD

This application relates to heating water for use in an enclosure and processing air for the enclosure and more particularly, but not by way of limitation, to methods and systems for reducing re-evaporation of water during introduction of ventilation air.

BACKGROUND

In an effort to reduce energy consumption, homes are being built with reduced air leakage compared to traditional building practices. Super insulated or sealed homes are being developed to reduce loss of heated or cooled air and, therefore, reduce the overall amount of energy needed to heat or cool a home. With the super insulated or sealed homes comes a need to control an intake of fresh air and a need for active dehumidification.

Net-Zero Energy (NZE) Homes are an example of super insulated or sealed homes. NZE homes are designed to be all electric and generate some or all of their own power for various energy requirements. NZE homes typically require controlled fresh-air ventilation as well as active dehumidification. However, fresh-air ventilation is often detrimental to dehumidification as fresh-air ventilation often causes re-evaporation of moisture that accumulates on an evaporator surface.

SUMMARY

This application relates to heating water for use in an enclosure and processing air for the enclosure and more particularly, but not by way of limitation, to methods and systems for reducing re-evaporation of water during introduction of ventilation air. In one aspect, the present invention relates to an apparatus. The apparatus includes a refrigeration circuit that includes an evaporator, a first condenser and a compressor. The apparatus includes a refrigerant-water heat exchanger that includes a second condenser fluidly coupled to the refrigeration circuit. A control valve is operatively connected to the refrigeration circuit to direct flow of refrigerant through at least one of the first condenser during a dehumidification mode and the second condenser during a water heating mode. A damper is disposed on an upwind side of the evaporator, the damper being operable to reduce airflow across the evaporator during a ventilation mode.

In another aspect, the present invention relates to a method of reducing re-evaporation of water during in a water heating and air processing (WHAP) system. The method includes providing a refrigeration circuit that includes an evaporator, a first condenser and a compressor. A refrigerant-water heat exchanger that includes a second condenser is fluidly coupled to the refrigeration circuit. Flow of refrigerant is directed, by the control valve, through the first condenser during a dehumidification mode or through the second condenser during a water heating mode. A damper is positioned upwind of the evaporator to reduce airflow across the evaporator when the WHAP system is operating in ventilation mode.

In another aspect, the present invention relates to a water heating and air processing (WHAP) system for heating potable water for an enclosure and processing air for the enclosure. The WHAP system includes a multi-mode dehumidifier and water heater that includes a refrigeration circuit having an evaporator, a first condenser, and a compressor and a refrigerant-water heat exchanger comprising a second condenser fluidly coupled to the refrigeration circuit. A control valve is operatively connected to the refrigeration circuit to direct flow of refrigerant through at least one of the first condenser during a dehumidification mode and the second condenser during a water heating mode. A damper is disposed on an upwind side of the evaporator, the damper being operable to reduce airflow across the evaporator during a ventilation mode.

BRIEF DESCRIPTION OF THE DRAWINGS

For a more complete understanding of the present invention and for further objects and advantages thereof, reference may now be had to the following description taken in conjunction with the accompanying drawings in which.

DETAILED DESCRIPTION

Various embodiments of the present invention will now be described more fully with reference to the accompanying drawings. The invention may, however, be embodied in many different forms and should not be construed as limited to the embodiments set forth herein.

Figure 1:
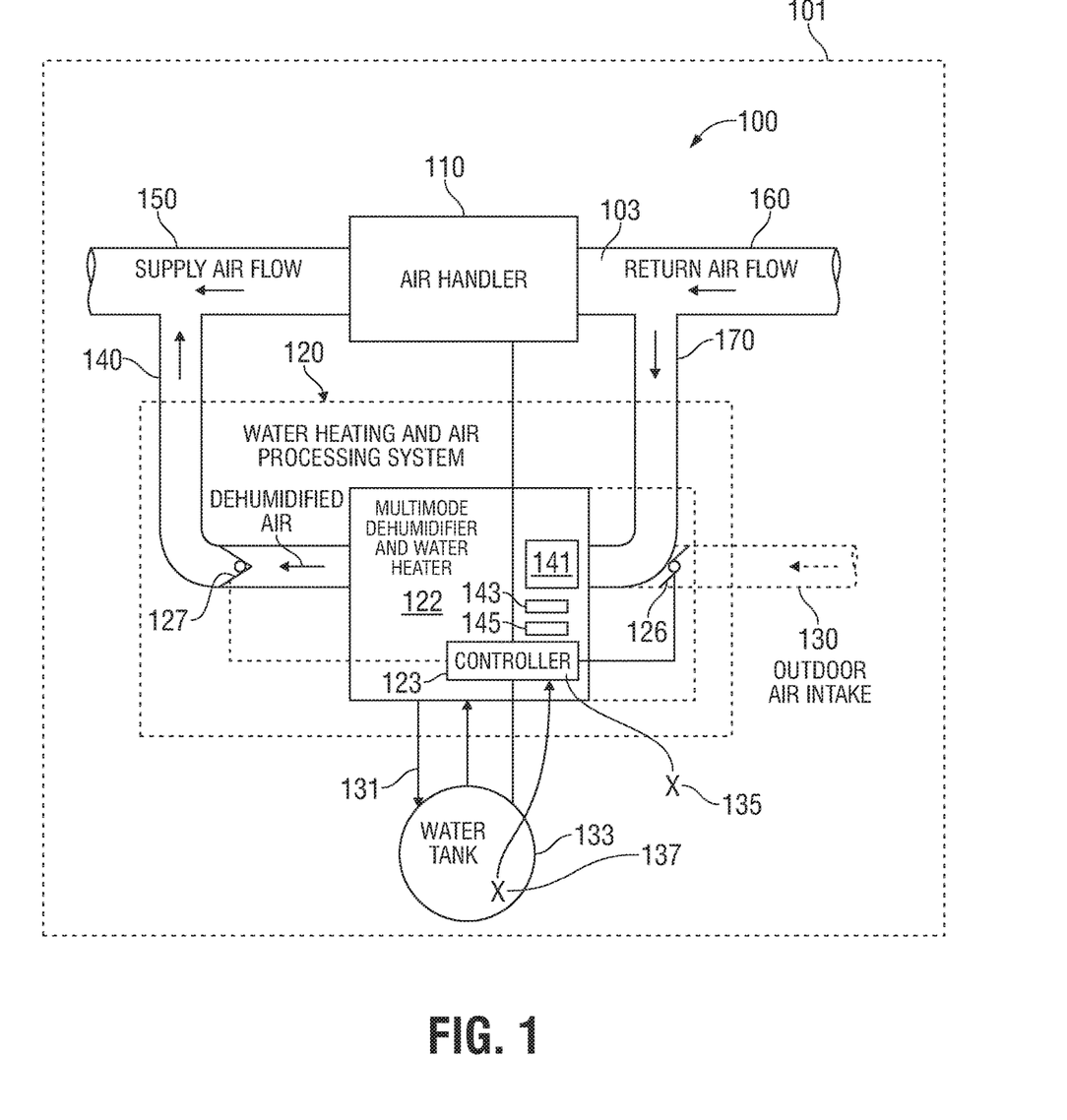
FIG. 1 is a schematic diagram of a system for providing conditioned air and water heating for an enclosure.

FIG. 1 is a schematic diagram of a system 100 for providing conditioned air and water heating for an enclosure 101. In a typical embodiment, the enclosure 101 may be a building such as a home or a business. In one embodiment, the enclosure 101 is a super-insulated or sealed home that is all-electric such as, for example, an NZE home. The system 100 includes an air handler 110 and a water heating and air processing (WHAP) system 120. A water tank 133 of the enclosure 101 is also illustrated in FIG. 1.

In a typical embodiment, the air handler 110 is a conventional HVAC system that is used to provide at least one of heating and cooling for the enclosure 101. In other embodiments, the air handler 110 may be any type of HVAC system or furnace as dictated by design requirements. The air handler 110 includes ducts 103 that receive air from the enclosure 101 and supply heated or cooled air to the enclosure 101. In a typical embodiment, the air handler 110 includes a circulating fan (not illustrated) that moves air through the enclosure 101.

The WHAP system 120 includes a multi-mode dehumidifier and water heater (MMDWH) 122, at least one backflow preventing damper 127, and at least one fresh air ventilation damper 126. The MMDWH 122 includes a refrigeration circuit 141, a refrigerant-water heat exchanger 143, and a control valve 145.

The MMDWH 122 also includes a dehumidifying and water heating controller (DWHC) 123. In a typical embodiment, the DWHC 123 is configured to direct operation of the MMDWH 122 and the at least one backflow preventing damper 127 in at least one of a water heating mode, a dehumidification mode, and a ventilating mode. In some embodiments, the at least one backflow preventing damper 127 operates automatically and is not coupled to the DWHC 123. In other embodiments, the at least one backflow preventing damper 127 is coupled to the DWHC 123 for control (as indicated by the dashed line in FIG. 1). In a typical embodiment, the DWHC 123 is a controller that is typically used in a conventional dehumidifier but is also configured to perform the additional functionalities described herein.

The DWHC 123 may be an integrated controller or a distributed controller that directs operation of the system 100. In a typical embodiment, the DWHC 123 includes an interface to receive, for example, thermostat calls, temperature setpoints, blower control signals, environmental conditions, and operating mode status for various zones of the system 100. For example, in a typical embodiment, the environmental conditions may include indoor temperature and relative humidity of the enclosure 101. In a typical embodiment, the DWHC 123 also includes a processor and a memory to direct operation of the system 100.

In addition to being configured to direct the operation of the MMDWH 122, the DWHC 123 is also configured to determine when to activate the water heating mode based on temperature data received from a thermostat 137 of the water tank 133. In a typical embodiment, the thermostat 137 is a conventional thermostat that determines a temperature of water stored in the water tank 133 and transmits the temperature or a representation thereof to the DWHC 123.

The DWHC 123 is also configured to determine when to activate at least one of the dehumidification mode and the ventilation mode. The dehumidification mode may, for example, be activated based on humidity data received from a humidity sensor 135 located in the enclosure 101. In a typical embodiment, the ventilation mode may, for example, be activated based on a predetermined time interval. For example, government or industry standards may require or suggest fresh-air requirements for the enclosure 101 at time intervals that are predetermined. In other embodiments, the fresh-air requirements may also be based on volume of air being moved instead of, or in conjunction with, time intervals.

In a typical embodiment, the DWHC 123 is configured to enable activation of the water heating mode, the dehumidification mode, and the ventilation mode based on priority levels. User preferences, government requirements, or industry standards may be used to set the priority levels in various embodiments. The priority levels may also be based on installation locations such as different climate regions. In one embodiment, the DWHC 123 may be configured to activate the water heating mode when water heating is needed (i.e., temperature of the water tank 133 is below a minimum threshold) even if there is a prior dehumidification mode request. In a typical embodiment, the DWHC 123 includes logic circuitry to determine the various operating modes based on input data and to direct the MMDWH 122 accordingly even when multiple modes are requested at the same time. In a typical embodiment, the DWHC 123 includes the necessary interfaces to receive user input and receive programming to direct operation thereof.

The WHAP system 120 is designed to heat potable water for the enclosure 101 and process air for the enclosure 101. Air processing performed by the WHAP system 120 may, in various embodiments, include dehumidification and fresh air ventilation. The potable water heated by the WHAP system 120 may be stored in the water tank 133 that is fluidly coupled to the WHAP system 120. In a typical embodiment, the water tank 133 may be a conventional hot-water-storage tank of the type used, for example, in commercial or residential buildings. The water tank 133 is fluidly coupled to the MMDWH 122 via piping or conduit 131. In some embodiments, the water tank 133 is located at a distance from the MMDWH 122 such that a water pump [not shown in FIG. 1] is needed to circulate water between the MMDWH 122 and the water tank 133. In a typical embodiment, the water pump may be a conventional pump that is used to circulate water. In other embodiments, the MMDWH 122 is located near or within the water tank 133 such that a water pump is not needed.

Still referring to FIG. 1, in a typical embodiment, the at least one fresh air ventilation damper 126 and the at least one backflow preventing damper 127 are conventionally installed in an inflow duct 130 that provides outdoor air for the enclosure 101 or in a dehumidified air duct 140 that provides dehumidified air for the enclosure 101. In one embodiment, the at least one fresh air ventilation damper 126 is, for example, a type of mixing damper that is positioned and configured to control intake airflow from all return air to all fresh air. The at least one fresh air ventilation damper 126 may be included as part of the MMDWH 122 in some embodiments. In a typical embodiment, the dehumidified air duct 140 also fluidly couples the WHAP system 120 to the air handler 110 via a supply duct 150. The WHAP system 120 is also fluidly coupled to a return duct 160 of the air handler 110 via an inflow duct 170. The ducts of the system 100 may be, for example, conventional flexible or rigid ducts of the type used in HVAC systems.

Figure 2:
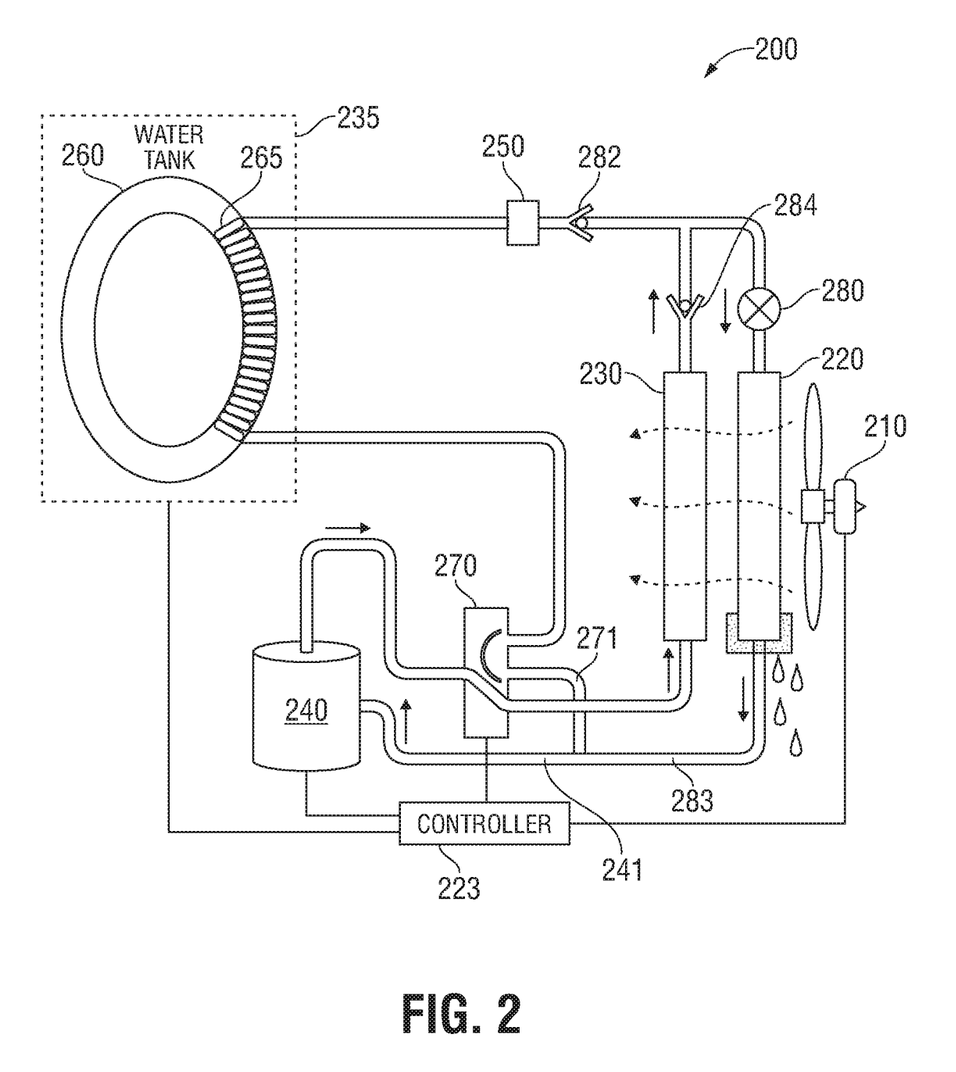
FIG. 2 is a schematic diagram of an exemplary multi-mode dehumidifier and water heater operating in a dehumidification mode.

FIG. 2 is a schematic diagram of an embodiment of an MMDWH 200 operating in a dehumidification mode. For purposes of discussion, FIG. 2 is described herein relative to FIG. 1. The MMDWH 200 includes a fan 210 and a refrigeration circuit 233 including an evaporator 220, a first condenser 230, a compressor 240, and a refrigerant reservoir 250. Additionally, the MMDWH 200 includes a refrigerant-water heat exchanger 260 having a second condenser 265 and a control valve 270. In this embodiment, the refrigerant-water heat exchanger 260 is located proximate a water source, such as in a water tank 235. As such, the MMDWH 200 does not need a water pump. The MMDWH 200 is operating in a dehumidification mode with the arrows representing the flow of refrigerant.

In a dehumidification mode, the compressor 240 moves the refrigerant through the refrigeration circuit 233 from the evaporator 220 outlet to the first condenser 230. The fan 210 circulates air over the evaporator 220 and the first condenser 230 of the refrigeration circuit 233. In a typical embodiment, air that is circulated over the evaporator 220 may be ducted through the return duct 160 or through the inflow duct 130. As the air moves over the evaporator 220, a dry-bulb temperature of the air is reduced below a saturation point of the air. Reduction of the dry-bulb air temperature below the saturation point causes the air to shed moisture. Cooler, drier air then leaves the evaporator 220 and flows over the first condenser 230. The first condenser 230 adds heat to the air that was removed by the evaporator 220. Thus, the first condenser 230 raises the temperature of the air without adding moisture to the air. The dehumidified air then flows back into the enclosure 101 via, for example, the dehumidified air duct 140 and the supply duct 150.

In the dehumidification mode, the control valve 270 allows refrigerant to flow through the refrigeration circuit 233 and prevents flow of refrigerant to the refrigerant-water heat exchanger 260 (i.e., a second condenser 265 that is located in the refrigerant-water heat exchanger 260). In a typical embodiment, the control valve 270 is, for example, a conventional reversing valve. In FIG. 2, a vent 271 of the control valve 270 is coupled to a suction line 241 of the compressor 240 to allow the compressor 240 to remove residual refrigerant from the second condenser 265 when the second condenser 265 is inactive. The refrigeration circuit 233 also includes an expansion valve 280 and a plurality of check valves 282, 284. In a typical embodiment, the plurality of check valves 282, 284 are positioned to prevent backflow of refrigerant through an inactive one of the first condenser 230 and the second condenser 265. For example, during the dehumidification mode, the check valve 282 prevents backflow of refrigerant to the second condenser 265 and during the water heating mode, the check valve 284 prevents backflow of refrigerant into the first condenser 230.

The refrigerant reservoir 250 stores refrigerant for use during particular operating modes and is operatively coupled to the refrigeration circuit 233. In a typical embodiment, a location and size of the refrigerant reservoir 250 is based on the volumes of the first condenser 230 and the second condenser 265. In the MMDWH 200 shown in FIG. 2, the internal volume of the first condenser 230 is illustrated as being greater than the internal volume of the second condenser 265. As such, the refrigerant reservoir 250 provides a storage capacity that approximates the difference between the internal volumes of the first condenser 230 and the second condenser 265. As illustrated in FIG. 2, a controller 223 directs operation of the MMDWH 200. In a typical embodiment, the controller 223 may be the DWHC 123 or, in other embodiments, may be a separate device.

Figure 3:
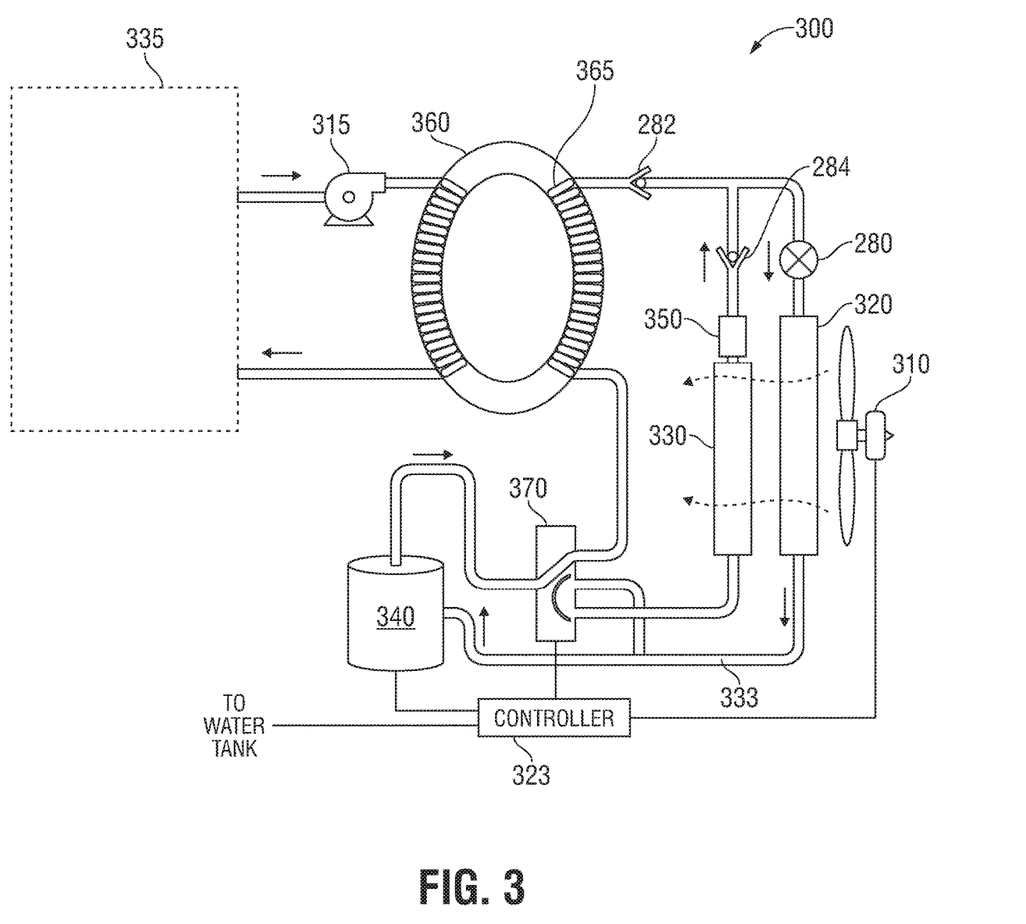
FIG. 3 is a schematic diagram of the exemplary multi-mode dehumidifier and water heater operating in a water-heating mode.

FIG. 3 is a schematic diagram of an MMDWH 300 operating in a water-heating mode. For purposes of discussion, FIG. 3 is described herein relative to FIGS. 1-2. The MMDWH 300 includes a fan 310 and a refrigeration circuit 333 including an evaporator 320, a first condenser 330, a compressor 340, and a refrigerant reservoir 350. Additionally, the MMDWH 300 includes a refrigerant-water heat exchanger 360 and a control valve 370. In the embodiment shown in FIG. 3, the refrigerant-water heat exchanger 360 is located distal from a water source, such as the water tank 335. As such, the MMDWH 300 includes a water pump 315 that circulates water between the refrigerant-water heat exchanger 360 and the water tank 335. The MMDWH 300 is operating in a water heating mode with the arrows representing the flow of refrigerant and water.

In a typical embodiment, operation of the fan 310, the evaporator 320, and the compressor 340 is similar to the operation of the fan 210, the evaporator 220, and the compressor 240 described above. In the water heating mode, however, the control valve 370 allows refrigerant to flow through the second condenser 365 and prevents flow of refrigerant through the first condenser 330. In the MMDWH 300, the refrigerant reservoir 350 is also located with the first condenser 330 indicating that the internal volume of the second condenser 365 is greater than the internal volume of the first condenser 330. The MMDWH 300 includes a controller 323 that is configured to direct the operation of the MMDWH 300. As illustrated in FIG. 3, a controller 323 directs operation of the MMDWH 300. In a typical embodiment, the controller 323 may be the DWHC 123 or, in other embodiments, may be a separate device.

Figure 4A:
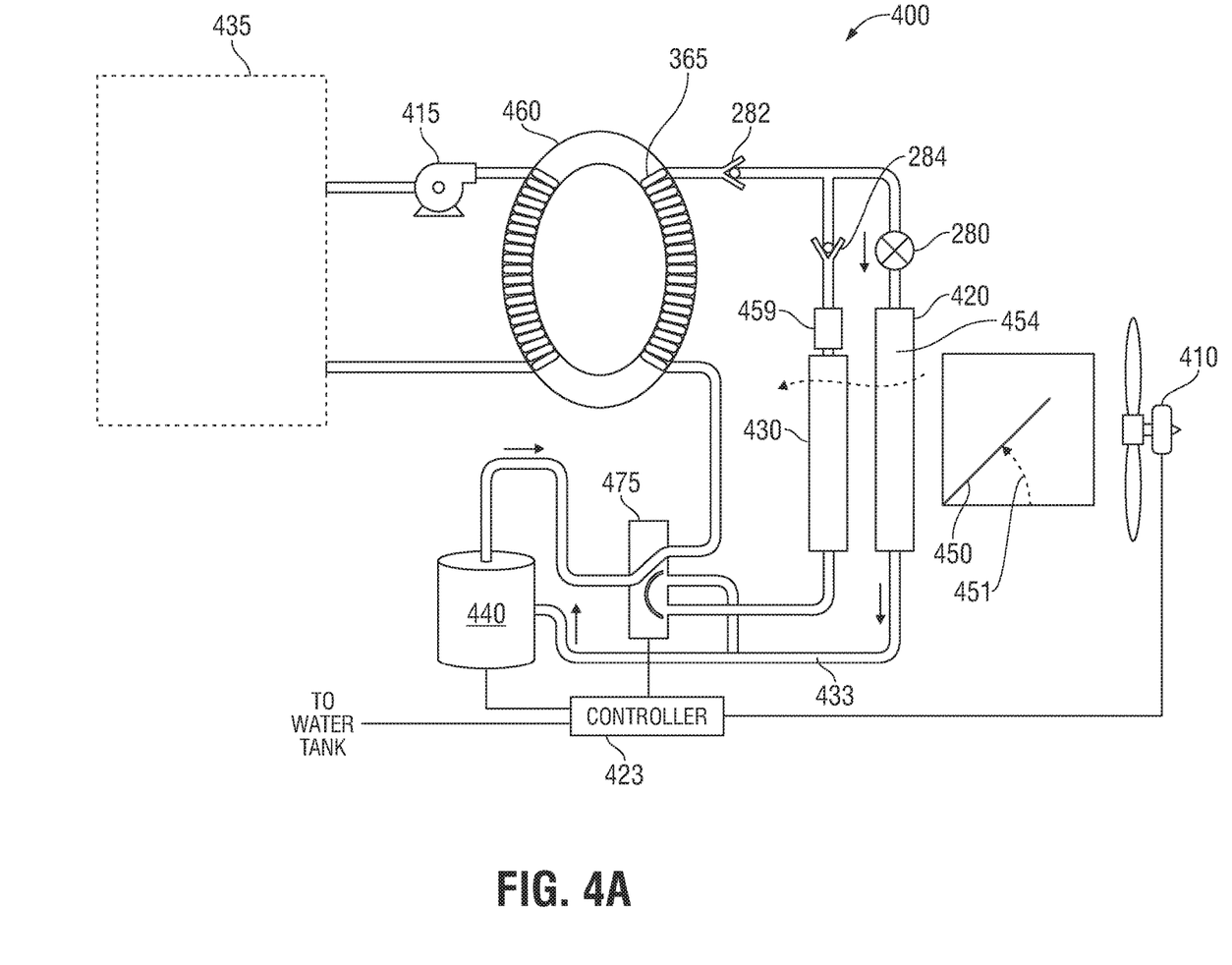
FIG. 4A is a schematic diagram of the exemplary multi-mode dehumidifier and water heater operating in ventilation mode with a damper.

FIG. 4A is a schematic diagram of an MMDWH 400 operating in ventilation mode with a damper 450. For purposes of discussion, FIG. 4A is described herein relative to FIGS. 1-3. The MMDWH 400 includes a fan 410 and a refrigeration circuit 433 including an evaporator 420, a first condenser 430, a compressor 440, and a refrigerant reservoir 459. Additionally, the MMDWH 400 includes a refrigerant-water heat exchanger 460 and the control valve 475. In a typical embodiment, the refrigerant-water heat exchanger 460 is located distal from a water source, such as a water tank 435. As such, the MMDWH 400 also includes a water pump 415 that circulates water between the refrigerant-water heat exchanger 460 and the water tank 435. In other embodiments, the refrigerant-water heat exchanger 460 may be located close to the water tank 435. In such an embodiment, the water pump 415 is omitted. As illustrated in FIG. 4A, a controller 423 directs operation of the MMDWH 400. In a typical embodiment, the controller 423 may be the DWHC 123 or, in other embodiments, may be a separate device.

As discussed above with respect to FIG. 2, when the MMDWH 400 is operating in dehumidification mode, moisture is removed from air as the air is circulated over the evaporator 420. Thus, in a typical embodiment, condensed water will accumulate on an exterior surface of the evaporator 420. In ventilation mode, refrigerant is not circulated through the evaporator 420 or the first condenser 430, thus moisture is not removed from air that is circulated over the evaporator 420. This situation causes accumulated water on the evaporator 420 to re-evaporate thereby raising the relative humidity of the air that is circulated over the evaporator 420. In ventilation mode, airflow in a second range of approximately 40 to 50 CFM is typically needed to accomplish adequate ventilation. In comparison, airflow in a first range of approximately 200 to 250 CFM is typically needed when the MMDWH 400 operates in dehumidification mode. Thus, in a typical embodiment, approximately one fifth of the airflow path over the evaporator 420 is needed to support ventilation. A damper 450 is disposed on an upwind side of the evaporator 420. In a typical embodiment, the damper 450 is disposed between the fan 410 and the evaporator 420; however, in other embodiments, the fan may be disposed in another location. In a typical embodiment, the damper 450 moves from an open position to a closed position when the MMDWH 400 is in ventilation mode and thereby exposes less of the surface of the evaporator 420 to circulating air. Movement of the damper 450 is illustrated in FIG. 4A by arrow 451. By exposing less of the surface of the evaporator 420 to circulating air, re-evaporation of accumulated water is reduced when the MMDWH is operating in ventilation mode. In various embodiments, the damper 450 could be, for example, a louvered damper, a pivoting damper, a plurality of flaps, or any other type of damper as dictated by design requirements.

Still referring to FIG. 4A, water that accumulates on the evaporator 420 typically flows in a downward direction. Thus a lower portion 452 of the evaporator 420 typically has more accumulated water than an upper portion 454 of the evaporator 420. In a typical embodiment, the damper 450 blocks the lower portion 452 of the evaporator 420 thereby preventing movement of air through the lower portion 452 of the evaporator 420. The damper 450 allows air to flow through the upper portion 454 of the evaporator 420 thereby ensuring that air passes only through the portion of the evaporator 420 that is likely to result in the least re-evaporation of moisture.

Figure 4B:
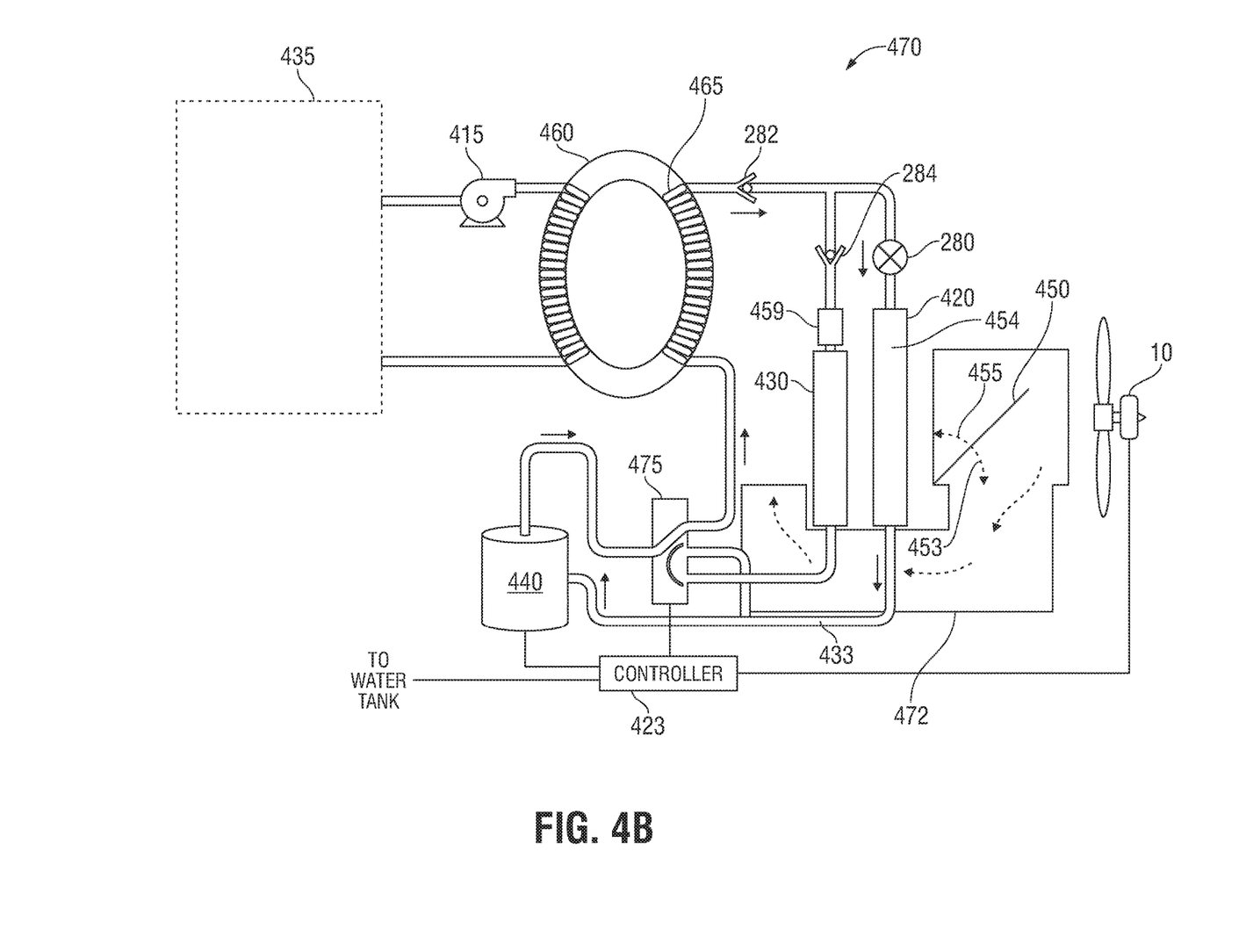
FIG. 4B is a schematic diagram of the exemplary multi-mode dehumidifier and water heater operating in ventilation mode with a bypass flow path.

FIG. 4B is a schematic diagram of an MMDWH 470 operating in ventilation mode with a bypass flow path 472. For purposes of discussion, FIG. 4B is described herein relative to FIGS. 1-4A. The bypass flow path 472 is constructed so as to allow airflow to bypass the evaporator 420 when the MMDWH 470 is operating in ventilation mode. The damper 450 opens and closes access to the bypass flow path 472. When the MMDWH 470 is operating, for example, in dehumidification mode, the damper 450 closes access to the bypass flow path 472. Thus, air is directed through the evaporator 420. When the MMDWH 470 is operating in ventilation mode, the damper 450 closes access to the evaporator 420 and directs air through the bypass flow path 472 when the MMDWH 470 is operating in ventilation mode. Movement of the damper 450 is illustrated in FIG. 4B by arrows 455 and 453. By directing air through the bypass flow path 472, re-evaporation of water accumulated on the surface of the evaporator 420 does not occur. As illustrated in FIG. 4B, the controller 423 directs operation of the MMDWH 470. In a typical embodiment, the controller 423 may be the DWHC 123 or, in other embodiments, may be a separate device.

Although various embodiments of the method and system of the present invention have been illustrated in the accompanying Drawings and described in the foregoing Specification, it will be understood that the invention is not limited to the embodiments disclosed, but is capable of numerous rearrangements, modifications, and substitutions without departing from the spirit and scope of the invention as set forth herein. It is intended that the Specification and examples be considered as illustrative only.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. An apparatus comprising:
a refrigeration circuit comprising an evaporator, a first condenser and a compressor;
a refrigerant-water heat exchanger comprising a second condenser fluidly coupled to the refrigeration circuit;
a control valve operatively connected to the refrigeration circuit to direct flow of refrigerant through at least one of the first condenser during a dehumidification mode and the second condenser during a water heating mode;
a flow path operable to allow airflow across the evaporator and the first condenser;
a bypass flow path operable to allow airflow to bypass an aligned arrangement of the evaporator and the first condenser;
a damper spaced apart from the evaporator and the first condenser and disposed in the bypass flow path between the evaporator and a fan, wherein the damper is disposed on an upwind side of the evaporator and downwind side of the fan; and
wherein the damper moves from an open position to a closed position when the apparatus is operating in a ventilation mode.

2. The apparatus of claim 1, wherein:
the closed position allows for the airflow to be directed through the evaporator and the first condenser, and the open position allows for the airflow to be directed through the bypass flow path.

3. The apparatus of claim 1, wherein the damper prevents air from flowing across a portion of the evaporator.

4. The apparatus of claim 1, wherein the damper, in the open position, directs air to the bypass flow path around the evaporator and the first condenser.

5. The apparatus of claim 1, wherein the damper reduces re-evaporation of water into air moving through the evaporator.

6. The apparatus of claim 1, wherein the damper comprises at least one of a louvered damper, a pivoting damper, and a plurality of flaps.

7. The apparatus as recited in claim 1, wherein the damper, in the closed position, directs air through the evaporator and the first condenser.

8. The apparatus of claim 1, wherein the damper reduces airflow across the evaporator from a first range of approximately 200 CFM to approximately 250 CFM to a second range of approximately 40 CFM to approximately 50 CFM.

9. The apparatus of claim 1, wherein the damper allows air to pass through an upper portion of the evaporator, while preventing air from flowing through a lower portion of the evaporator.

10. The apparatus of claim 1 further comprising a refrigerant reservoir operatively connected to the refrigeration circuit.

11. The apparatus of claim 10 wherein, the refrigerant reservoir is operatively connected at a location of the refrigeration circuit based on a volume of the first condenser compared to the volume of the second condenser.

12. A method of reducing re-evaporation of water in a water heating and air processing (WHAP) system, the method comprising:
  providing a refrigeration circuit comprising an evaporator, a first condenser and a compressor;
  fluidly coupling a refrigerant-water heat exchanger comprising a second condenser to the refrigeration circuit;
  directing, utilizing a control valve, flow of refrigerant through the first condenser during a dehumidification mode or through the second condenser during a water heating mode;
  positioning a damper spaced apart from the evaporator and the first condenser to form a flow path operable to allow airflow across the evaporator and the first condenser and a bypass flow path operable to allow airflow to bypass the evaporator and the first condenser, and between the evaporator and a fan to reduce airflow across the evaporator when the WHAP system is operating in a ventilation mode, wherein the damper is disposed on an upwind side of the evaporator and downwind side of the fan; and
  wherein the damper moves from an open position to a closed position when the apparatus is operating in the ventilation mode.

13. The method of claim 12, wherein:
  the closed position allows for the airflow to be directed through the evaporator and the first condenser, and the open position allows for the airflow to be directed through the bypass flow path.

14. The method of claim 12, comprising preventing, utilizing the damper, air from flowing over a portion of the evaporator.

15. The method of claim 12, comprising directing, utilizing the closed position of the damper, air to the bypass flow path around the evaporator and the first condenser.

16. The method of claim 12, comprising reducing, utilizing the damper, re-evaporation of water into air moving through the evaporator.

17. The method of claim 12, comprising reducing, utilizing the damper, airflow across the evaporator from a first range of approximately 200 CFM to approximately 250 CFM to a second range of approximately 40 CFM to approximately 50 CFM.

18. The method of claim 12, comprising allowing, utilizing the damper, air to pass through an upper portion of the evaporator, while preventing air from flowing through a lower portion of the evaporator.

19. The method of claim 12, wherein the damper comprises at least one of a louvered damper, a pivoting damper, and a plurality of flaps.

20. A water heating and air processing (WHAP) system for heating potable water for an enclosure and processing air for the enclosure, the WHAP system comprising:
  a multi-mode dehumidifier and water heater comprising:
    a refrigeration circuit comprising an evaporator, a first condenser and a compressor;
    a refrigerant-water heat exchanger comprising a second condenser fluidly coupled to the refrigeration circuit;
    a control valve operatively connected to the refrigeration circuit to direct flow of refrigerant through at least one of the first condenser during a dehumidification mode and the second condenser during a water heating mode;
    a flow path operable to allow airflow across the evaporator and the first condenser;
    a bypass flow path operable to allow airflow to bypass an aligned arrangement of the evaporator and the first condenser;
    a damper spaced apart from the evaporator and the first condenser and disposed in the bypass flow path between the evaporator and a fan, wherein the damper is disposed on an upwind side of the evaporator and downwind side of the fan; and
    wherein the damper moves from an open position to a closed position when the WHAP system is operating in a ventilation mode.

* * * * *